S. A. ELLIS & C. BROWN.
Insect-Destroyers.
No. 148,682. Patented March 17, 1874.
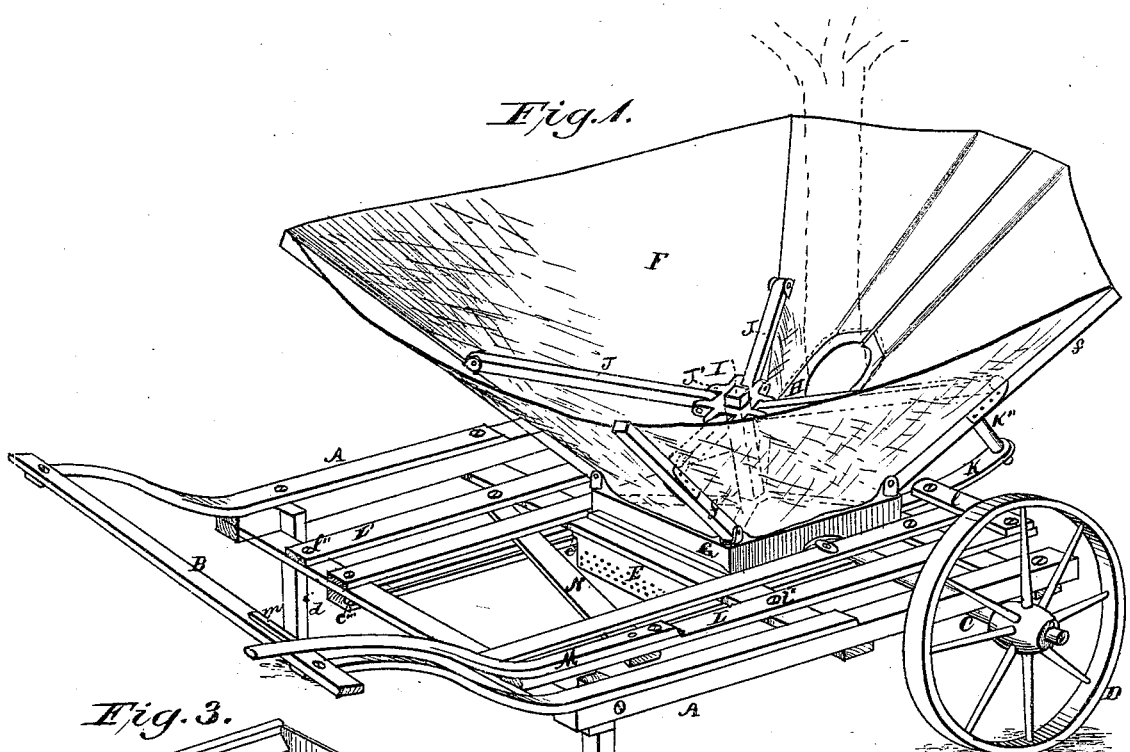
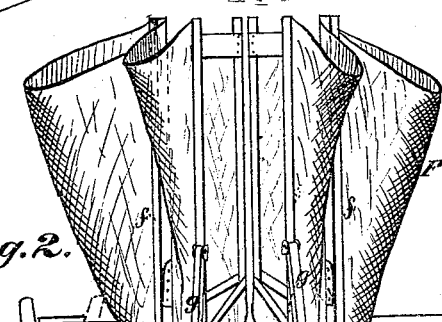
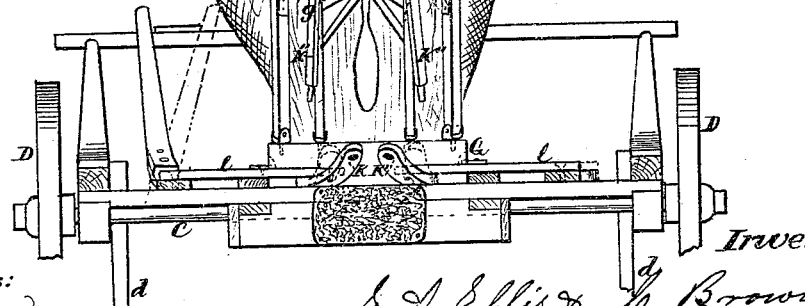

UNITED STATES PATENT OFFICE.

SMITH A. ELLIS, OF OTTAWA, AND CALEB BROWN, OF NORWALK, OHIO.

IMPROVEMENT IN INSECT-DESTROYERS.

Specification forming part of Letters Patent No. 148,682, dated March 17, 1874; application filed September 5, 1873.

*To all whom it may concern:*

Be it known that we, SMITH A. ELLIS, of Ottawa, Putnam county, Ohio, and CALEB BROWN, of Norwalk, in the county of Huron and State of Ohio, have invented a certain new and useful Improvement in Insect-Destroyers, of which the following is a specification:

It is the object of our invention to produce an effective apparatus for catching and destroying insects infecting fruit-trees, so constructed as to be simple in operation and easily moved from tree to tree.

The improvements are fully hereinafter described and claimed.

The invention consists of an arrangement of parts for operating the canvas, which will be fully hereinafter described. It further consists of a peculiarly-constructed trap, hereinafter described.

In the accompanying drawings, Figure 1 is a perspective view with the canvas spread open; Fig. 2, a rear elevation with the canvas folded up; and Fig. 3, a plan view of the insect box or trap. A light skeleton supporting-frame, A, provided with a suitable handle, B, for propelling it, is mounted upon an axle, C, supported on a pair of wheels, D. A pair of legs, $d$, like those of a wheelbarrow, serve to balance the machine when at rest. A box or trap, E, is secured about under the center of the supporting-frame, beneath the axle. This box has a central ridge, $e$, inclining toward the sides of the box, and reaching nearly to its bottom. Inclined flanges $e^1$, on the sides of the trap, project inward and overlap the lower edges of the ridge $e$. The box is provided with flanges $e^2$, to slide it in and out in guideways $e^3$ on the under side of the supporting-frame. A piece of canvas, F, or other similar flexible material, is stretched upon and secured to ribs $f$, which are hinged at their lower ends to the corners of a boxing or fence, G, over the trap E. On each side of the slit at the back of the canvas are secured light supports $g$ $g$, to stretch and keep taut the edges of the opening. These supports $g$ $g$ are also hinged to the boxing G. At the lower edge of the slit in the canvas is inserted a piece of rubber or elastic cloth, H, having an oblong opening therein, forming a continuation of the slit. A stud or standard, I, is supported securely, as shown in dotted lines in Fig. 1, centrally over the trap. A bracing-frame, to hold the canvas open, is composed of rods J, hinged to the ribs $f$ at their outer ends, and to a head, J', at their inner ends. The head fits and slides upon the upright I, and holds the canvas open until released by hand from the opening at the back. Short arms K K$^1$ are pivoted at the back of the frame. Rods K$^2$ K$^2$, pivoted to and hanging from the supports $g$ $g$, fit at their lower ends in holes in the arms K K$^1$. Pieces L L', one on each side of the frame, are connected at their rear ends by short bars $l$ $l$, with the pivoted arms K K$^1$ by joints. The piece L is pivoted at $l^1$ to a cross-piece of the supporting-frame, and extends forward to the propelling-handle B, forming a lever, M, and terminating in a handle provided with a detent, $m$, which locks it in the desired position. The piece L' is pivoted to the supporting-frame at $l^2$, and is jointed to the piece L and lever M by a bar, N.

In operation, the canvas is opened and wheeled to a tree infected with the curculio or other destructive insects, and pushed so that the tree enters the slit in the back of the canvas. As soon as the tree has entered to the bottom of the slit, where the rubber is, the lever is operated to close the slit in the canvas, which is accomplished by means of the connection of the lever with the arms K K$^1$, which operate the supports $g$ $g$ at the edges of the slit. The rubber fits tightly around the tree, without injuring it, and conforms to any inequalities in the trunk. The tree is shaken, and the insects fall into the canvas and down its sides into the box, where they hit upon the inclined sides of the ridge or upon the sloping flanges on the sides of the box, and are precipitated to the bottom of the trap, where they may be killed by the use of suitable fluid, after which the trap may be removed by sliding it out on the ways $e^3$, to empty and cleanse it. When the insects on the first tree have been caught, the apparatus is removed by opening the back of the canvas by a movement of the lever, and taken to another tree.

What we claim as our invention is—

1. The levers L L', connected together by the bar N, and carrying at their outer ends the rods $l\ l$, as described, in combination with the pivoted arms $K\ K^1$, rods $K^2\ K^2$, supports $g\ g$, and canvas F, all arranged and operating in the manner and for the purpose specified.

2. The trap E, having the central ridge $e$, inclined flanges $e^1$, and projecting flanges $e^2$, and adapted to the grooves $e^3$ in the supporting-frame, substantially as described.

In testimony that we claim the foregoing we have hereunto set our hands and seals this 30th day of August, 1873.

SMITH A. ELLIS. [L. S.]
CALEB BROWN. [L. S.]

Witnesses:
W. D. JOHNSTON,
GEO. BARGUS.